US012165613B2

(12) United States Patent
Zhang et al.

(10) Patent No.: US 12,165,613 B2
(45) Date of Patent: Dec. 10, 2024

(54) SCREEN CORRECTION METHOD, ELECTRONIC DEVICE AND COMPUTER-READABLE STORAGE MEDIUM FOR ADJUSTING DISPLAY UNIFORMITY

(71) Applicants: Haining ESWIN Computing Technology Co., Ltd., Haining (CN); Beijing ESWIN Computing Technology Co., Ltd., Beijing (CN)

(72) Inventors: Chi Zhang, Jiaxing (CN); Qiqiang Han, Jiaxing (CN); Meng Guo, Jiaxing (CN)

(73) Assignees: HAINING ESWIN COMPUTING TECHNOLOGY CO., LTD., Zhejiang (CN); BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/145,385

(22) Filed: Dec. 22, 2022

(65) Prior Publication Data

US 2023/0215403 A1 Jul. 6, 2023

(30) Foreign Application Priority Data

Dec. 30, 2021 (CN) ......................... 202111683793.8

(51) Int. Cl.
*G09G 5/10* (2006.01)

(52) U.S. Cl.
CPC ....... *G09G 5/10* (2013.01); *G09G 2320/0204* (2013.01); *G09G 2320/0626* (2013.01)

(58) Field of Classification Search
CPC ............. G09G 5/10; G09G 2320/0204; G09G 2320/0626; G09G 2320/0233;
(Continued)

(56) References Cited

U.S. PATENT DOCUMENTS

2011/0234644 A1* 9/2011 Park ......................... G09G 5/10 345/690
2013/0293567 A1* 11/2013 Shigeta .................... G09G 5/02 345/589

(Continued)

FOREIGN PATENT DOCUMENTS

CN 107068114 A 8/2017
CN 107180605 A 9/2017

(Continued)

*Primary Examiner* — Rodney Amadiz
(74) *Attorney, Agent, or Firm* — Ladas & Parry, LLP

(57) ABSTRACT

Embodiments of the present disclosure relate to the technical field of displays, and disclose a screen correction method, an electronic device, and a computer-readable storage medium. The method comprises: acquiring a first display parameter of pixel points in at least two display regions of a target screen, wherein the first display parameter comprises first spectral tristimulus values; determining a target region in the display regions and determining a second display parameter of pixel points in a non-target region in the display regions according to the first display parameter, wherein the target region is a display region among the display regions where a luminance parameter meets a preset requirement, and the second display parameter comprises second spectral tristimulus values; converting the luminance parameter into a target display parameter with the type of the second spectral tristimulus values; and compensating the second display parameter based on the target display parameter.

13 Claims, 5 Drawing Sheets

(58) Field of Classification Search
CPC ... G09G 2320/0242; G09G 2320/0666; G09G 3/36; G09G 2360/145; G06F 3/1407; G06T 3/4007
See application file for complete search history.

(56) References Cited

U.S. PATENT DOCUMENTS

| | | | | |
|---|---|---|---|---|
| 2017/0098406 | A1* | 4/2017 | Kobayashi | G09G 5/10 |
| 2018/0308452 | A1 | 10/2018 | Zhang | |

FOREIGN PATENT DOCUMENTS

| | | | |
|---|---|---|---|
| CN | 109272968 | A | 1/2019 |
| CN | 109300084 | A | 2/2019 |
| CN | 110070824 | A | 7/2019 |
| CN | 112017577 | A | 12/2020 |

* cited by examiner

SCREEN CORRECTION METHOD, ELECTRONIC DEVICE AND COMPUTER-READABLE STORAGE MEDIUM FOR ADJUSTING DISPLAY UNIFORMITY

CROSS-REFERENCE TO RELATED APPLICATIONS

The present disclosure is based on and claims priority to China Patent Application No. 202111683793.8, filed on Dec. 30, 2021, in the China National Intellectual Property Administration, the disclosures of which are incorporated by reference herein in their entirety.

TECHNICAL FIELD

The present disclosure relates to the technical field of displays, and in particular, to a screen correction method, an electronic device and a computer-readable storage medium.

BACKGROUND

Liquid crystal displays (LCDs) have been widely used in the display field, for example, in industrial applications, human-machine interfaces of some machines, panels of complex control equipment, displays of medical instruments, etc. However, due to the limitations of LCD panel manufacturing technology or hardware defects, the produced LCDs may fail to achieve the theoretical display effect. For example, when a same driving signal is input to each of the pixel points of an LCD screen, the luminance and chromaticity of optical signals output at pixel points may be inconsistent, that is, there may be difference in chromaticity and luminance. When the difference in luminance and chromaticity between pixel points is greater than the difference range that can be recognized by the human eyes, the human eyes can easily perceive these poor display effects, resulting in visual discomfort for the viewers. Therefore, it is necessary to adjust the display uniformity of an LCD panel.

SUMMARY

Embodiments of the present disclosure provide a screen correction method to provide a way to adjust the display uniformity of an LCD panel.

Correspondingly, the embodiments of the present disclosure further provide an electronic device and a storage medium, so as to ensure the implementation and application of the above method.

In order to solve the above problems, an embodiment of the present disclosure discloses a screen correction method, including:

- acquiring a first display parameter of pixel points in at least two display regions of a target screen, wherein the first display parameter includes first spectral tristimulus values;
- determining a target region in the display regions and determining a second display parameter of pixel points in a non-target region in the display regions according to the first display parameter, wherein the target region is a display region among the display regions where a luminance parameter meets a preset requirement, and the second display parameter includes second spectral tristimulus values;
- converting the luminance parameter into a target display parameter with the type of the second spectral tristimulus values; and
- compensating the second display parameter based on the target display parameter.

The embodiments of the present disclosure further disclose an electronic device, including a memory, a processor, and computer programs stored on the memory and capable of running on the processor, the computer programs comprising:

- an acquisition module, configured to acquire a first display parameter of pixel points in at least two display regions of a target screen, wherein the first display parameter comprises first spectral tristimulus values;
- a determination module, configured to determine a target region in the display regions and determining a second display parameter of pixel points in a non-target region in the display regions according to the first display parameter, wherein the target region is a display region among the display regions where a luminance parameter meets a preset requirement, and the second display parameter comprises second spectral tristimulus values;
- a conversion module, configured to convert the luminance parameter into a target display parameter with the type of the second spectral tristimulus values; and
- a compensation module, configured to compensate the second display parameter based on the target display parameter.

The embodiments of the present disclosure further disclose a computer-readable storage medium having computer programs stored thereon that, when executed by a processor, implements a screen correction method, the method includes:

- acquiring a first display parameter of pixel points in at least two display regions of a target screen, wherein the first display parameter comprises first spectral tristimulus values;
- determining a target region in the display regions and determining a second display parameter of pixel points in a non-target region in the display regions according to the first display parameter, wherein the target region is a display region among the display regions where a luminance parameter meets a preset requirement, and the second display parameter comprises second spectral tristimulus values;
- converting the luminance parameter into a target display parameter with the type of the second spectral tristimulus values; and
- compensating the second display parameter based on the target display parameter.

The technical solutions provided in the embodiments of the present disclosure have the following beneficial effects.

In the embodiments of the present disclosure, a first display parameter of pixel points in at least two display regions of a target screen is acquired; a target region in the display regions is determined and a second display parameter of pixel points in a non-target region in the display regions is determined according to the first display parameter; the luminance parameter is converted into a target display parameter with the type of the second spectral tristimulus values; and a compensation coefficient is calculated for the non-target region according to the target display parameter, and the second display parameter for each non-target region is compensated. In this way, during the screen correction to an LCD panel, by compensating the display parameter of the non-target region based on the display parameter of the target region, the corrected luminance and chromaticity are the same or similar to those of the target region. The display effect of the entire LCD panel is made uniform, and the correction accuracy to the LCD panel is improved.

Additional aspects and advantages of the embodiments of the present disclosure will be given in the following description, some of which will become apparent from the following description or appreciated by implementing the present disclosure.

BRIEF DESCRIPTION OF THE DRAWINGS

The above and/or additional aspects and advantages of the present disclosure will become apparent and be readily understood from the following description of embodiments with reference to the accompanying drawings, in which.

DETAILED DESCRIPTION

Embodiments of the present disclosure will be described below with reference to the accompanying drawings in the present disclosure. It should be understood that the embodiments to be described below with reference to the accompanying drawings are exemplary descriptions for explaining the technical solutions of the embodiments of the present disclosure, and do not limit the technical solutions of the embodiments of the present disclosure.

It may be understood by those skilled in the art that singular forms “a”, “an”, “said”, and “the” may be intended to include plural forms as well, unless otherwise stated. It should be further understood that the terms “comprising” and “including” used in the embodiments of the present disclosure mean that corresponding features may be implemented as presented features, information, data, steps, operations, elements and/or components, but do not exclude that they are implemented as other features, information, data, steps, operations, elements, components, and/or combinations thereof as supported in the art. It should be understood that, when an element is referred as being “connected” or “coupled” to another element, this element may be directly connected or coupled to the other element, or this element and the other element may be connected through intervening elements. In addition, “connected to” or “coupled to” as used herein may include wireless connection or coupling. The term “and/or” as used herein indicates at least one of the items defined by the term, e.g., “A and/or B” may be implemented as “A”, or as “B”, or as “A and B”.

To make the objectives, technical solutions and advantages of the present disclosure clearer, the implementations of the present disclosure will be further described below in detail with reference to the accompanying drawings.

Figure 1:
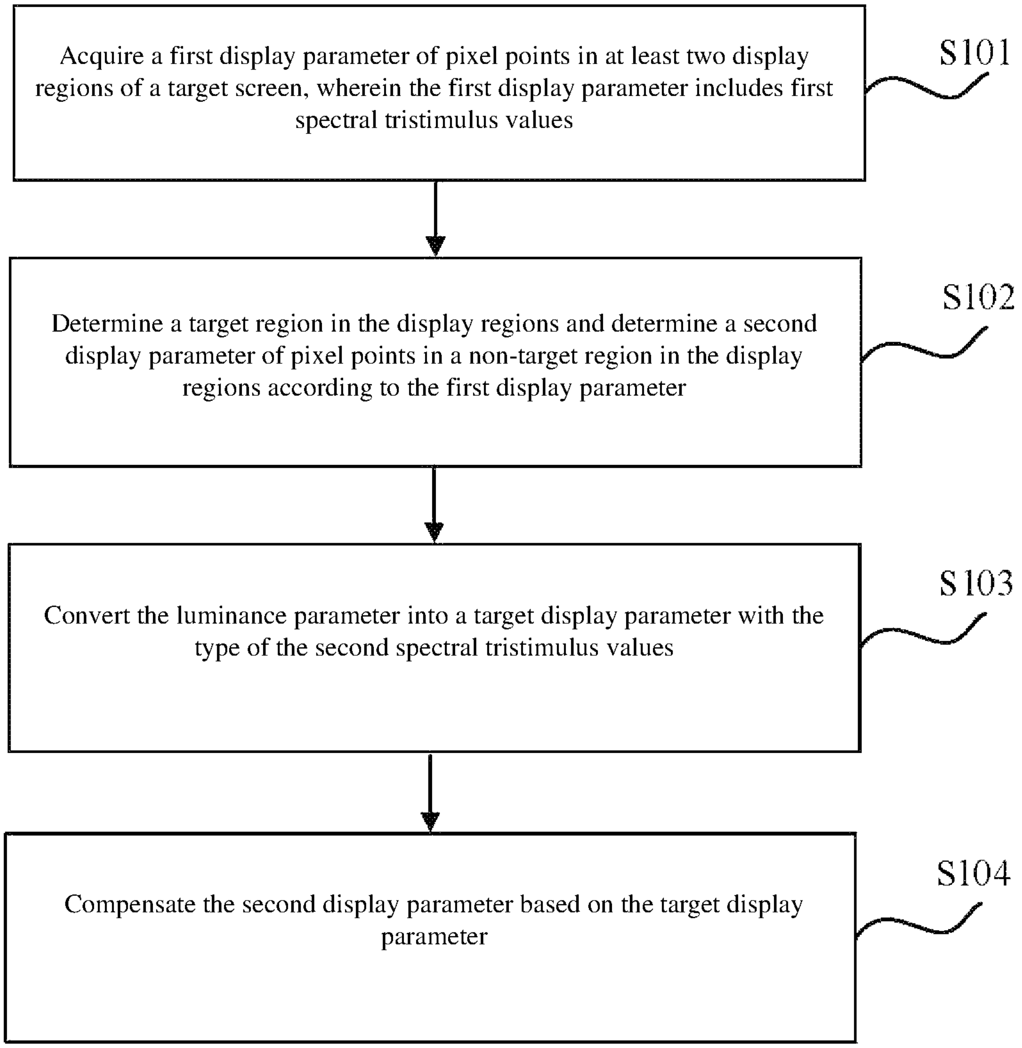
FIG. 1 is a flowchart of a screen correction method according to an embodiment of the present disclosure.

Referring to FIG. 1, an embodiment of the present disclosure provides a screen correction method. Optionally, the method is applied to an electronic device including an LCD. The method may include the following steps.

S101: A first display parameter of pixel points in at least two display regions of a target screen is acquired, wherein the first display parameter includes first spectral tristimulus values.

Specifically, in the LCD display process, Mura defects are likely to occur. For example, for LCDs, the luminance display defects are mainly shown as the non-uniformity of brightness and darkness changes like dots, lines, clusters and bands in local regions, and the non-uniformity defects of chromaticity display are mainly shown as reddish, bluish, greenish changes or deviation from the white point coordinates of the D65 color gamut in local regions or the entire panel. The reasons for the Mura defects are, for example, inconsistent electrical characteristics of drive circuits of each one of the pixels due to improper parameter design of the drive circuits, non-uniform luminance of backlight sources, non-uniformity of liquid crystal materials, inconsistent gap distances between two glass substrates, and inaccurate control on temperature and humidity in the production environment, etc. The production process of LCDs is complex. It is difficult for LCDs produced under the existing production conditions to avoid the Mura defects. That is, the above-mentioned defects are difficult to be solved by material production, manufacturing process and so on. Therefore, in the embodiments of the present disclosure, the Mura defects are solved by improving the display uniformity.

The target screen may be an LCD. Optionally, the LCD may include a cold cathode fluorescent lamp (CCFL) display and a light-emitting diode (LED) display. The target screen includes at least two display regions. For example, the target screen is pre-divided into a plurality of display regions, and then the screen correction is performed on each display region respectively to improve the precision of screen correction.

The first display parameter includes first spectral tristimulus values. Optionally, the first spectral tristimulus values can be of CIE-XYZ type. Specifically, the spectral tristimulus values can be of CIE-RGB type and CIE-XYZ type. The spectral tristimulus values of the CIE-RGB type refer to the number of three primary colors that match the equal-energy spectral colors.

The first display parameter may include the Y value in the CIE-XYZ data, and “Y” represents the luminance (or luma) parameter, that is, the gray level value. Optionally, the luminance parameter may be obtained by measuring with an optical measurement device, for example, an industrial camera, a color analyzer.

S102: A target region in the display regions is determined and a second display parameter of pixel points in a non-target region in the display regions is determined according to the first display parameter, wherein the target region is a display region among the display regions where a luminance parameter meets a preset requirement, and the second display parameter includes second spectral tristimulus values.

For each display region, after determining the first display parameter, target regions in all display regions are determined according to the display parameter of each display region. The target region is a reference region in the screen correction process. In the screen correction process, other non-target regions (compensation regions) are corrected with reference to the display parameter of this region, so that the display regions of the entire screen are corrected with reference to the display effect of the target region. The display uniformity of the screen is improved. Specifically, the target region is a display region among the display regions where the luminance parameter meets a preset requirement. For example, the target region is a region with the smallest luminance parameter. The luminance parameter includes the Y value in the CIE-XYZ data.

The second display parameter of pixel points in a non-target region in the display regions is determined. The non-target region is the compensation region. The second display parameter can be of CIE-RGB type, that is, RGB data.

On the basis of the CIE-XYZ type, the second display parameter is obtained by mathematically converting the spectral tristimulus values of the CIE-XYZ type into the spectral tristimulus values of the CIE-XYZ type. As an example, the linear relationship adopted when converting the first display parameter (CIE-XYZ data) into the corresponding target RGB data may be shown in the following formula 1:

$$\begin{bmatrix} R \\ G \\ B \end{bmatrix} = \begin{bmatrix} a & b & c \\ d & e & f \\ g & h & i \end{bmatrix} * \begin{bmatrix} X \\ Y \\ Z \end{bmatrix} \quad \text{Formula 1}$$

where $$\begin{bmatrix} a & b & c \\ d & e & f \\ g & h & i \end{bmatrix}$$

is the parameter conversion matrix. Given a specific light source and an RGB model, the parameter conversion matrix is uniquely determined. In this way, after the first display parameter is obtained, it may be converted into the second display parameter with the type of the second spectral tristimulus values (CIE-RGB) according to the above conversion relationship.

S103: The luminance parameter is converted into a target display parameter with the type of the second spectral tristimulus values.

The luminance parameter (i.e., Y data) is converted into a target display parameter of RGB data and used as the RGB data reference adjustment value of the compensation regions. Optionally, the tristimulus values in the RGB color space and the tristimulus values in the XYZ color space may be approximately represented as a linear conversion relationship. A preset linear conversion relationship may be used to convert the XYZ data into corresponding target RGB data.

Specifically, according to the above formula 1, the XYZ data needs to be obtained for obtaining the RGB data. In a case where the first display parameter includes Y data, X data and Z data may be obtained respectively according to the following formula 2 and formula 3:

$$X=(Y/y)*x \quad \text{Formula 2:}$$

$$Z=(Y/y)*(1-x-y) \quad \text{Formula 3:}$$

where x and y represent the color gamut coordinate values corresponding to X and Y, respectively.

After the X, Y, and Z data are determined respectively, the RGB data, i.e., the target display parameter, may be obtained by conversion according to the above formula 1.

S104: The second display parameter is compensated based on the target display parameter.

After the target display parameter is obtained, a compensation coefficient for a non-target region is calculated according to the target display parameter, and the second display parameter of each non-target region is compensated. In this way, during the screen correction to an LCD panel, by compensating the display parameter of the non-target region based on the display parameter of the target region, the corrected luminance and chromaticity are the same or similar to those of the target region. The display effect of the entire LCD panel is made uniform, and the correction accuracy to the LCD panel is improved.

It may be understood that, after the target display parameter is obtained, a compensation coefficient for the target region may also be calculated according to the target display parameter, and the second display parameter of the target region may be compensated. For example, when there are many pixel points in the current region, compensation also needs to be performed to ensure the uniformity of the display effect of the target region.

In an optional embodiment, the acquiring a first display parameter of pixel points in at least two display regions of a target screen includes:

in a case where a target screen displays a target image, acquiring a first display parameter of pixel points in at least two display regions of the target screen, wherein a gray level parameter of the target image is a preset gray level value.

Specifically, each digital image is composed of many pixel points. Usually, each pixel is composed of three sub-pixel points of red, green and blue (RGB), which can present many different colors. For each sub-pixel, the light source behind it can show different luminance levels. The gray level represents different luminance levels from the darkest to the brightest. That is, the gray level is to divide the luminance change between the brightest and the darkest into several parts, so as to facilitate the control on the screen luminance corresponding to the signal input.

Before performing correction on the LCD screen, first, the LCD screen is controlled to display an image with a preset gray level to ensure that each pixel point in the display region is corrected with the same reference point. Optionally, the values of the R, G and B channels may be [255, 255, 255] when the preset gray level value is 8 bit, [1023, 1023, 1023] when it is 10 bit, and [4095, 4095, 4095] when it is 12 bit.

In an optional embodiment, before the acquiring a first display parameter of pixel points in at least two display regions of a target screen, the method includes case 1 or case 2.

In case 1, a display interface of the target screen is divided into at least two display regions.

Figure 2:
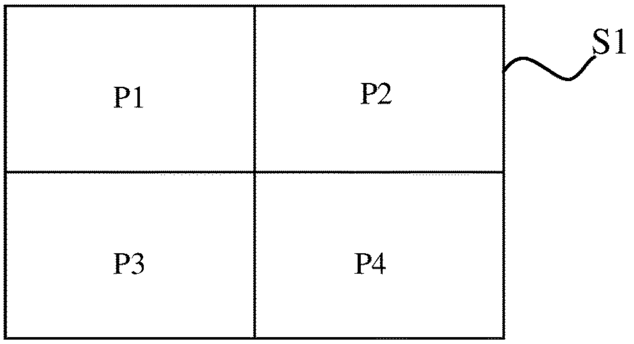
FIG. 2 is a schematic diagram of a first example according to an embodiment of the present disclosure.

The target screen is pre-divided into a plurality of display regions, and then screen correction is performed on each display region respectively so as to improve the precision of screen correction. As a first example, as shown in FIG. 2, the target screen S1 is divided into a display region P1, a display region P2, a display region P3, and a display region P4. In the process of screen correction, the target region is determined from among P1 to P4.

Figure 3:
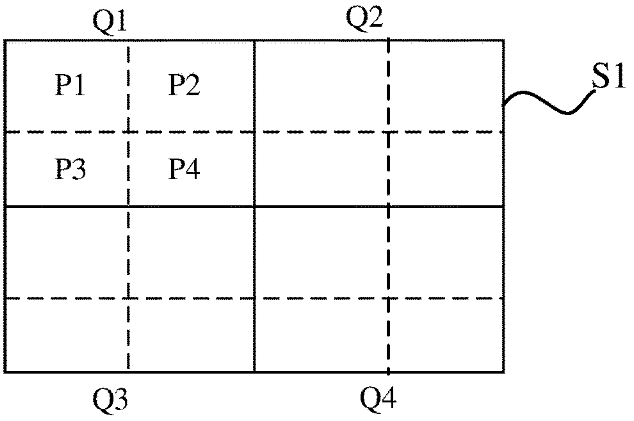
FIG. 3 is a schematic diagram of a second example according to an embodiment of the present disclosure.

In case 2, the target screen is divided into at least two display interfaces, and each of the display interfaces is divided into at least two display regions. In addition, the target screen may also be divided into a plurality of display interfaces, and each display interface is further divided into a plurality of display regions. In this way, in the process of screen correction, a target region as a correction reference may be determined in each display interface. As a second example, as shown in FIG. 3, the target screen S1 is divided into a display interface Q1, a display interface Q2, a display interface Q3, a display interface Q4. The display interface is a region surrounded by solid lines. Each display interface is further divided into display regions. For example, the display interface Q1 is further divided into a display region P1, a display region P2, a display region P3, and a display region P4. For the display interface Q1, in the process of screen correction, the target region is determined from among P1 to P4.

In an optional embodiment, the luminance parameter includes a mean value or a median value of the luminance of pixel points in the target region. Each display region includes a plurality of pixel points. The luminance values of all pixel points are aggregated, and the mean value or the median value is used as the luminance parameter of this display region.

The preset requirement is that a luminance parameter of the target region is a minimum value, a mean value or a median value of luminance parameters in the display regions. That is, the target region may be, among all display regions, a region corresponding to the minimum value of the luminance parameter, or a region corresponding to the mean value of the luminance, or a region corresponding to the median value of the luminance. In addition, it may be other parameters, which will not be limited in the embodiment of the present disclosure.

In an optional embodiment, the compensating the second display parameter based on the target display parameter includes:

- determining a compensation coefficient for pixel points in the non-target region according to the target display parameter and the second display parameter; and
- compensating a second display parameter of pixel points in the non-target region according to the compensation coefficient.

After obtaining the target display parameter, a compensation coefficient is calculated for a non-target region according to the target display parameter and the second display parameter. Specifically, the target display parameter and the second display parameter are RGB data, and then the compensation data is the compensation value between the RGB data. As an example, taking the target display parameter ($R_{target}$, $G_{target}$, $B_{target}$) and the second display parameter (R, G, B) as an example, the compensation coefficient includes ($R_{gain}$, $G_{gain}$, $B_{gain}$), as shown in the following formulae 1:

$$R_{gain}=R_{target}/R$$

$$G_{gain}=G_{target}/G$$

$$B_{gain}=D_{target}/B$$

Optionally, in the embodiment of the present disclosure, the compensating the second display parameter based on the target display parameter includes:

- sampling a compensation coefficient for pixel points in the non-target region to obtain a sampled compensation coefficient for each sampling unit; and
- compensating the second display parameter of pixel points in the non-target region according to the sampled compensation coefficient.

In the process of compensating the non-target region, the compensation coefficient for the non-target region may be sampled first, for example, down-sampled. Each sampling unit may be a pixel point, or a sampling block including a plurality of pixel points. The sampling block may be 4×4, 8×8, 16×16, 32×32, 64×64, 128×128 in size, wherein the number indicates the number of pixel points. Taking a sampling unit being a sampling block as an example, the median, minimum or maximum value of the compensation coefficient in the sampling block can be collected as the sampled compensation coefficient. After the sampled compensation coefficient is obtained, the second display parameter of pixel points in the non-target region is compensated according to the sampled compensation coefficient.

Specially, the compensating the second display parameter of pixel points in the non-target region according to the sampled compensation coefficient includes:

- acquiring a reference compensation coefficient for a target pixel point in the non-target region, the reference compensation coefficient including the sampled compensation coefficient for a sampling unit adjacent to the target pixel point;
- performing an interpolation process according to the reference compensation coefficient to obtain a target compensation coefficient for the target pixel point; and
- compensating the second display parameter of the target pixel point according to the target compensation coefficient.

The target pixel point is a pixel point in the non-target region. For the target pixel point, the sampled compensation coefficient for an adjacent sampling unit is determined according to the current position of the pixel point in the sampling unit (for example, the sampling block). For example, the compensation coefficients for adjacent sampling blocks in the horizontal and vertical directions within the current block are determined.

Optionally, after the sampled compensation coefficient is obtained, a compensation coefficient lookup table may be created, and the sampled compensation coefficient corresponding to each pixel point (or sampling unit) is recorded in the compensation coefficient lookup table. In this way, the reference compensation coefficient may be obtained by searching for the compensation coefficient lookup table. For example, the reference compensation coefficient is determined according to the offset coordinates of the current pixel point in the horizontal and vertical directions of the sampling unit, and then the reference compensation coefficient is interpolated to obtain the target compensation coefficient for the target pixel point. For example, the bilinear interpolation method is used for interpolation. The compensation coefficient value for the current pixel point in each RGB channel is calculated. For example, if R_ratio_interp is obtained by final interpolation, then R_ratio_interp is the target compensation coefficient for the current pixel point and used to compensate the R value in the second display parameter of the target pixel point.

Figure 4:
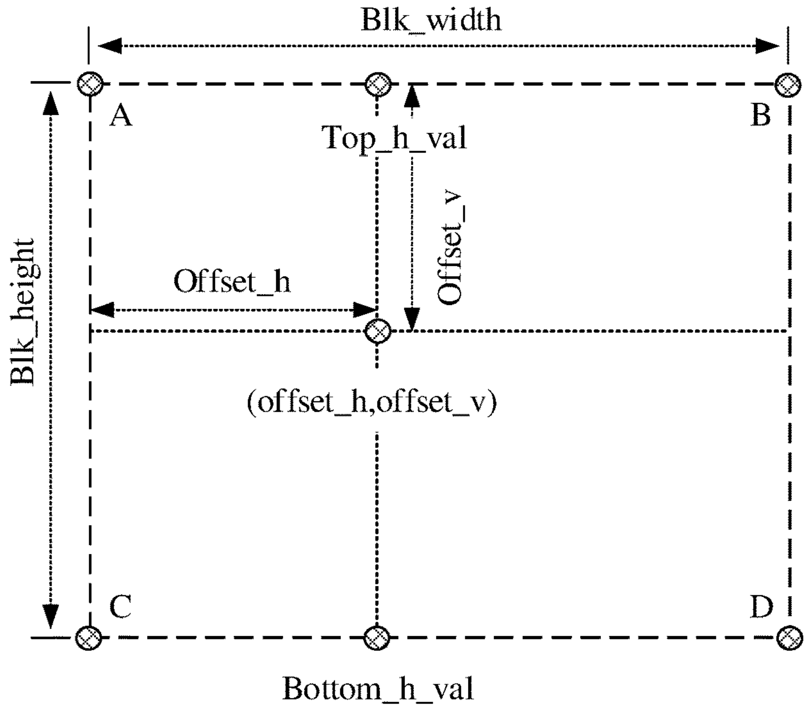
FIG. 4 is a flowchart of a third example according to an embodiment of the present disclosure.

As a third example, FIG. 4 shows the interpolation process. A, B, C, D represent four sampled compensation coefficient s, and the four values are subjected to bilinear interpolation. Blk_width represents the sampling interval in the horizontal direction, and Blk_height represents the sampling interval in the vertical direction. Offset_h represents the horizontal coordinate of the relative offset of the current pixel point in the current sampling block, and offset_v represents the vertical coordinate of the relative offset of the current pixel point in the current sampling block. The specific interpolation calculation formula is as follows:

$$Top\_h\_val = A*(Blk\_height - Offset_h) + B*(Offset\_h)/Blk\_height;$$

$$Bottom\_h\_val = C*(Blk\_height - Offset_h) + D*(Offset\_h)/Blk\_height;$$

$$Gain\_ratio = Top\_h\_val*(Blk\_height - Offset_h) + Bottom\_h\_val*(Offset\_v)/Blk\_height;$$

where Top_h_val represents the top interpolation result calculated by bilinear interpolation in the horizontal direction, Bottom_h_val represents the bottom interpolation result calculated by bilinear interpolation in the horizontal direction, and Gain_ratio represents the final output result in the vertical direction obtained by interpolation according to Top_h_val and Bottom_h_val. The final output result is the target compensation coefficient.

Figure 5:
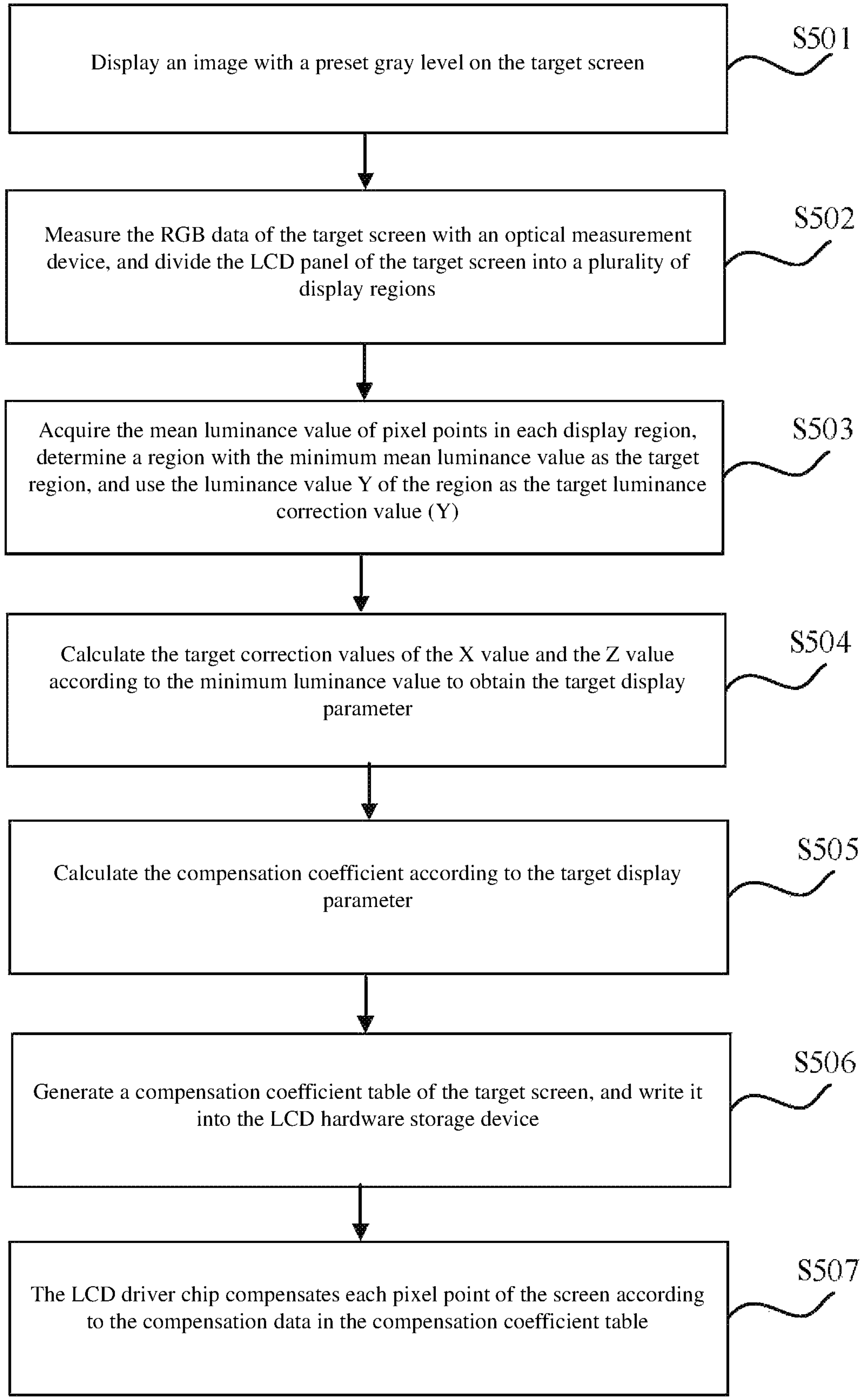
FIG. 5 is a flowchart of a fourth example according to an embodiment of the present disclosure.

As a fourth example, referring to FIG. 5, a specific example will be used below to illustrate the application process of the screen correction method according to the embodiment of the present disclosure. The entire correction process is divided into two stages: compensation data calculation and generation stage, and panel compensation and correction stage.

In the compensation data calculation and generation stage, a first display parameter required by the target screen is measured by an optical measurement device. The optical measurement device may be an industrial camera, or a high-precision optical measurement device, for example, a color analyzer. This stage mainly includes the following steps.

S501: An image with a preset gray level is displayed on the target screen.

Before performing correction on the LCD screen, the LCD screen is firstly controlled to display an image with a preset gray level. The preset gray level value may be RGB (255, 255, 255).

S502: The RGB data of the target screen is measured by an optical measurement device, and the LCD panel of the target screen is divided into a plurality of display regions.

S503: The mean luminance value of pixel points in each display region is acquired, a region with the minimum mean luminance value is determined as the target region, and the luminance value Y of the region is used as the target luminance correction value (Y).

S504: The target correction values of the X value and the Z value are calculated according to the minimum luminance value to obtain the target display parameter.

According to the formula 2, formula 3, and Y value, the target correction value X of the X value and the target correction value Z of the Z value are calculated; and then the target correction value is converted into RGB data (that is, the target display parameter) according to the formula 1.

For example, in the D65 color gamut coordinate system under the CIE 1931 standard, (x, y)=(0.31271, 0.32902), the gray level is 8 bit:

when Y_target=200, then X_target=(200/0.32902)*0.31271=190.08;

Z_target=(200/0.32902)*(1−0.32902−0.31271)=217.78;

X_target, Y_target, and Z_target are converted according to the coefficient conversion matrix to obtain the target display parameters R_target, G_target, B_target; specifically:

R_target=X_target*3.240479+Y_target*(−1.537150)+Z_target*(−0.498535)=199.95;

G_target=X_target*(−0.969256)+Y_target*(1.875992)+Z_target*(−0.041556)=181.9 1;

B_target=X_target*(0.055648)+Y_target*(−0.204043)+Z_target*1.057311)=200.03.

S505: The compensation coefficient is calculated according to the target display parameter.

For example, conversion from a certain pixel point (X, Y, Z)=(200, 210, 190) obtained by shooting to R, G and B are as follows:

$$R = X*3.240479 + Y*(-1.537150) + Z*(-0.498535) = 230.57;$$

$$G = X*(-0.969256) + Y*(1.875992) + Z*(-0.041556) = 192.21;$$

$$B = X*(0.055648) + Y*(-0.204043) + Z*(1.057311) - 169.17;$$

then, the compensation coefficients for the corresponding R, G and B of the current pixel point are adjusted as follows:

$$R\_gain = 199.95/230.57 = 0.867198;$$

$$G\_gain = 181.91/192.21 = 0.94641;$$

$$B\_gain = 200.03/169.17 = 1.18242.$$

Optionally, after calculating the adjusted compensation coefficients for R, G and B of each pixel point, the compensation coefficient for the entire panel is down-sampled at equal intervals. The adjusted compensation coefficient for the current pixel point may be used for down-sampling, or the mean, minimum, maximum or median value in the neighborhood of the current pixel point may be used for down-sampling.

S506: A compensation coefficient table for the target screen is generated, and written into the LCD hardware storage device.

The panel compensation and correction stage includes a step S507 in which the LCD driver chip compensates each pixel point of the screen according to the compensation data in the compensation coefficient table.

After the compensation lookup table is generated, according to the position of the current pixel point in the space where the panel is located, the ABCD values are searched in the compensation coefficient lookup table, and the compensation adjustment coefficient at the corresponding position is calculated by interpolation.

Figure 6:
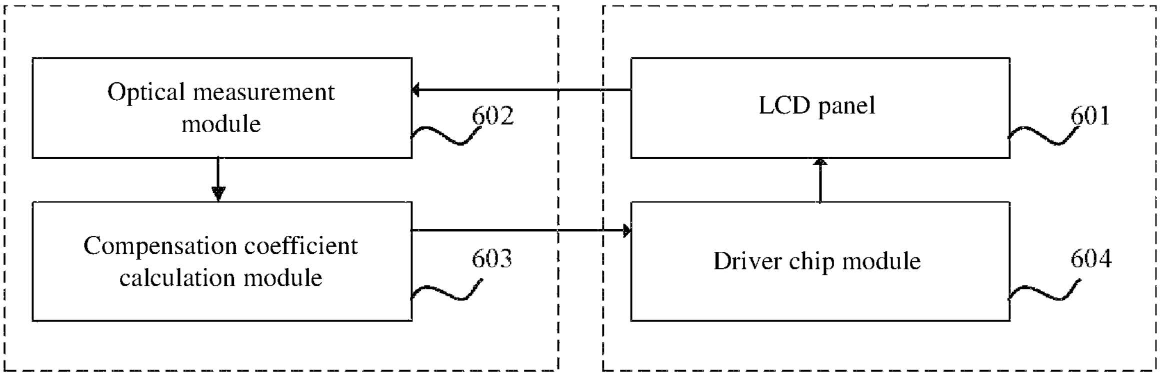
FIG. 6 is a schematic diagram of a fourth example according to an embodiment of the present disclosure.

Further, referring to FIG. 6, taking the electronic device where the target screen is located executing the screen correction method as an example, the electronic device includes the following modules:

an LCD panel 601, an optical measurement module 602, a compensation coefficient calculation module 603, and a driver chip module 604;

the LCD panel 601 is configured to execute step S501;

the optical measurement module 602 is configured to execute step S502;

the compensation coefficient calculation module 603 is configured to execute steps S503 to S507; and the driver chip module 604 is configured to execute step S508.

In the embodiments of the present disclosure, a first display parameter of pixel points in at least two display regions of a target screen is acquired; a target region in the display regions is determined and a second display parameter of pixel points in a non-target region in the display regions is determined according to the first display parameter; the luminance parameter is converted into a target display parameter with the type of the second spectral tristimulus values; and a compensation coefficient is calculated for the non-target region according to the target display parameter, and the second display parameter for each non-target region is compensated. In this way, during the screen correction to an LCD panel, by compensating the display parameter of the non-target region based on the display parameter of the target region, the corrected luminance and chromaticity are the same or similar to those of the target region. The display effect of the entire LCD panel is made uniform, and the correction accuracy to the LCD panel is improved.

Figure 7:
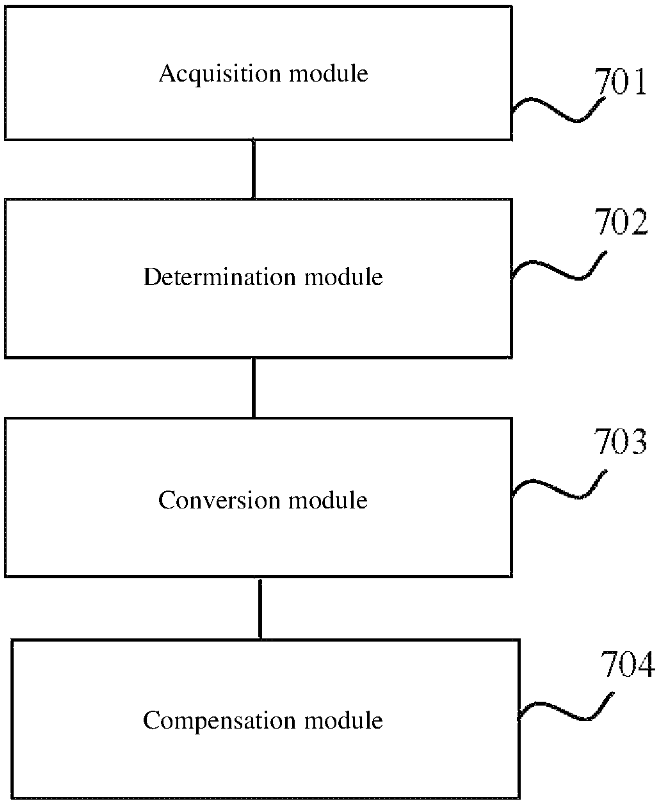
FIG. 7 is a schematic structure diagram of a screen correction apparatus according to an embodiment of the present disclosure.

Based on the same principle as the method according to the embodiment of the present disclosure, an embodiment of the present disclosure further provides a screen correction apparatus, as shown in FIG. 7, including:

- an acquisition module 701, configured to acquire a first display parameter of pixel points in at least two display regions of a target screen, wherein the first display parameter includes first spectral tristimulus values.

Specifically, in the LCD display process, Mura defects are likely to occur. For example, for LCDs, the luminance display defects are mainly shown as the non-uniformity of brightness and darkness changes like dots, lines, clusters and bands in local regions, and the non-uniformity defects of chromaticity display are mainly shown as reddish, bluish, greenish changes or deviation from the white point coordinates of the D65 color gamut in local regions or the entire panel. The reasons for the Mura defects are, for example, inconsistent electrical characteristics of drive circuits of each one of the pixels due to improper parameter design of the drive circuits, non-uniform luminance of backlight sources, non-uniformity of liquid crystal materials, inconsistent gap distances between two glass substrates, and inaccurate control on temperature and humidity in the production environment, etc. The production process of LCDs is complex. It is difficult for LCDs produced under the existing production conditions to avoid the Mura defects. That is, the above-mentioned defects are difficult to be solved by material production, manufacturing process and so on. Therefore, in the embodiments of the present disclosure, the Mura defects are solved by improving the display uniformity.

The target screen may be an LCD. Optionally, the LCD may include a cold cathode fluorescent lamp (CCFL) display and a light-emitting diode (LED) display. The target screen includes at least two display regions. For example, the target screen is pre-divided into a plurality of display regions, and then screen correction is performed on each display region respectively to improve the precision of screen correction.

The first display parameter includes first spectral tristimulus values. Optionally, the first spectral tristimulus values can be of CIE-XYZ type. Specifically, the spectral tristimulus values can be of CIE-RGB type and CIE-XYZ type. The spectral tristimulus values of the CIE-RGB type refer to the number of three primary colors that match the equal-energy spectral colors.

The first display parameter may include the Y value in the CIE-XYZ data, and "Y" represents the luminance (or luma) parameter, that is, the gray level value. Optionally, the luminance parameter may be obtained by measuring with an optical measurement device, for example, an industrial camera, a color analyzer.

The apparatus further includes a determination module 702, configured to determine a target region in the display regions and determining a second display parameter of pixel points in a non-target region in the display regions according to the first display parameter, wherein the target region is a display region among the display regions where a luminance parameter meets a preset requirement, and the second display parameter includes second spectral tristimulus values;

For each display region, after determining the first display parameter, target regions in all display regions are determined according to the display parameter of each display region. The target region is a reference region in the screen correction process. In the screen correction process, other non-target regions (compensation regions) are corrected with reference to the display parameter of this region, so that the display regions of the entire screen are corrected with reference to the display effect of the target region. The display uniformity of the screen is improved. Specifically, the target region is a display region among the display regions where the luminance parameter meets a preset requirement. For example, the target region is a region with the smallest luminance parameter. The luminance parameter includes the Y value in the CIE-XYZ data.

The second display parameter of pixel points in a non-target region in the display regions is determined. The non-target region is the compensation region. The second display parameter can be of CIE-RGB type, that is, RGB data.

On the basis of the CIE-XYZ type, the second display parameter is obtained by mathematically converting the spectral tristimulus values of the CIE-XYZ type into the spectral tristimulus values of the CIE-XYZ type. As an example, a display region includes nine pixel points. The linear relationship adopted when converting the first display parameter (CIE-XYZ data) into the corresponding target RGB data may be shown in the following formula 1:

$$\begin{bmatrix} R \\ G \\ B \end{bmatrix} = \begin{bmatrix} a & b & c \\ d & e & f \\ g & h & i \end{bmatrix} * \begin{bmatrix} X \\ Y \\ Z \end{bmatrix} \quad \text{Formula 1}$$

where $$\begin{bmatrix} a & b & c \\ d & e & f \\ g & h & i \end{bmatrix}$$

is the parameter conversion matrix. Given a specific light source and an RGB model, the parameter conversion matrix is uniquely determined. In this way, after the first display parameter is obtained, it may be converted into the second display parameter with the type of the second spectral tristimulus values (CIE-RGB) according to the above conversion relationship.

The apparatus further includes a conversion module 703, configured to convert the luminance parameter into a target display parameter with the type of the second spectral tristimulus values.

The luminance parameter (i.e., Y data) is converted into a target display parameter of RGB data and used as the RGB data reference adjustment value of the compensation regions. Optionally, the tristimulus values in the RGB color space and the tristimulus values in the XYZ color space may be approximately represented as a linear conversion relationship. A preset linear conversion relationship may be used to convert the XYZ data into corresponding target RGB data.

Specifically, according to the above formula 1, the XYZ data needs to be obtained for obtaining the RGB data. In a case where the first display parameter includes Y data, X data and Z data may be obtained respectively according to the following formula 2 and formula 3:

$$X=(Y/y)*x \quad \text{Formula 2:}$$

$$Z=(Y/y)*(1-x-y) \quad \text{Formula 3:}$$

where x and y represent the color gamut coordinate values corresponding to X and Y, respectively.

After the X, Y, and Z data are determined respectively, the RGB data, i.e., the target display parameter, may be obtained by conversion according to the above formula 1.

The apparatus further includes a compensation module 704, configured to compensate the second display parameter based on the target display parameter.

After the target display parameter is obtained, a compensation coefficient for a non-target region is calculated according to the target display parameter, and the second display parameter of each non-target region is compensated. In this way, during the screen correction to an LCD panel, by compensating the display parameter of the non-target region based on the display parameter of the target region, the corrected luminance and chromaticity are the same or similar to those of the target region. The display effect of the entire LCD panel is made uniform, and the correction accuracy to the LCD panel is improved.

Optionally, in the embodiment of the present disclosure, the acquisition module 701 is configured to:

in a case where a target screen displays a target image, acquire a first display parameter of pixel points in at least two display regions of the target screen, wherein a gray level parameter of the target image is a preset gray level value.

Optionally, in the embodiment of the present disclosure, the apparatus further includes:

a division module that, before the acquisition module 701 acquires the first display parameter of pixel points in at least two display regions of the target screen, is configured to:

divide a display interface of the target screen into at least two display regions;

or divide the target screen into at least two display interfaces, and divide each of the display interfaces into at least two display regions.

Optionally, in the embodiment of the present disclosure, the luminance parameter includes a mean value or a median value of the luminance of pixel points in the target region; and the preset requirement is that a luminance parameter of the target region is a minimum value, a mean value or a median value of luminance parameters in the display regions.

Optionally, in the embodiment of the present disclosure, the compensation module 704 includes:

a determination sub-module, configured to determine a compensation coefficient for pixel points in the non-target region according to the target display parameter and the second display parameter; and a compensation sub-module, configured to compensate a second display parameter of pixel points in the non-target region according to the compensation coefficient.

Optionally, in the embodiment of the present disclosure, the compensation sub-module is configured to:

sample a compensation coefficient for pixel points in the non-target region to obtain a sampled compensation coefficient for each sampling unit; and compensate the second display parameter of pixel points in a non-target region according to the sampled compensation coefficient.

Optionally, in the embodiment of the present disclosure, the compensation sub-module is further configured to:

acquire a reference compensation coefficient for a target pixel point in the non-target region, the reference compensation coefficient including the sampled compensation coefficient for a sampling unit adjacent to the target pixel point;

perform interpolation according to the reference compensation coefficient to obtain a target compensation coefficient for the target pixel point; and compensate the second display parameter of the target pixel point according to the target compensation coefficient.

The screen correction apparatus provided in the embodiment of the present disclosure can implement each process implemented in the method embodiments of FIG. 1 to FIG. 6. To avoid repetition, details will not be described here.

In the screen correction apparatus according to the present disclosure, the acquisition module 701 acquires a first display parameter of pixel points in at least two display regions of a target screen; the determination module 702 determines a target region in the display regions and determines a second display parameter of pixel points in a non-target region in the display regions according to the first display parameter; the conversion module 703 converts the luminance parameter into a target display parameter with the type of the second spectral tristimulus values; and the compensation module 704 compensates the second display parameter of each non-target region based on the target display parameter. In this way, during the screen correction to an LCD panel, by compensating the display parameter of the non-target region based on the display parameter of the target region, the corrected luminance and chromaticity are the same or similar to those of the target region. The display effect of the entire LCD panel is made uniform, and the correction accuracy to the LCD panel is improved.

The screen correction apparatus of the embodiments of the present disclosure can execute the screen correction method of the embodiments of the present disclosure, and the implementation principles thereof are similar. The actions performed by modules and units in the screen correction apparatus of the embodiments of the present disclosure correspond to the steps in the screen correction method of the embodiments of the present disclosure. Correspondingly, for the detailed functional description of modules of the screen correction apparatus, reference may be made to the description in the corresponding screen correction method described above, and details will not be repeated here.

Based on the same principles as the methods in the embodiments of the present disclosure, an embodiment of the present disclosure further provides an electronic device which may include, but not limited to, a processor and a memory. The memory is configured to store computer programs. The processor is configured to execute the screen correction method in any of optional embodiments of the present disclosure by invoking the computer programs.

Figure 8:
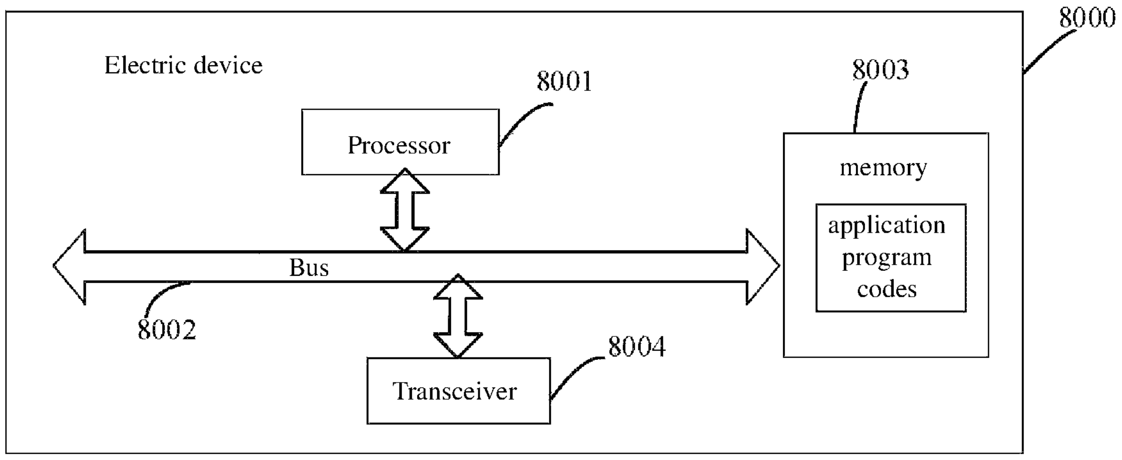
FIG. 8 is a schematic structure diagram of an electronic device according to an embodiment of the present disclosure.

In an optional embodiment, an electronic device is provided. As shown in FIG. 8, the electronic device 8000 shown in FIG. 8 includes a processor 8001 and a memory 8003. The processor 8001 is connected to the memory 8003, for example, through a bus 8002. Optionally, the electronic device 8000 may further include a transceiver 8004, and the transceiver 8004 may be used for data interaction (for example, data transmission and/or data reception) between the electronic device and other electronic devices. It should be noted that, in practical applications, the number of the transceivers 8004 is not limited to one, and the structure of the electronic device 8000 does not constitute any limitations to the embodiments of the present disclosure.

The processor 8001 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute various exemplary logical blocks, modules and circuits described in connection with the present disclosure. The processor 8001 may also be a combination for realizing computing functions, for example, a combination of one or more microprocessors, a combination of a DSP and a microprocessor, etc.

The bus 8002 may include a path to transfer information between the components described above. The bus 8002 may be a peripheral component interconnect (PCI) bus, or an extended industry standard architecture (EISA) bus, etc. The bus 8002 may be an address bus, a data bus, a control bus, etc. For ease of presentation, the bus is represented by only one thick line in FIG. 8. However, it does not mean that there is only one bus or one type of buses.

The memory 8003 may be, but is not limited to, read only memories (ROMs) or other types of static storage devices that can store static information and instructions, random access memories (RAMs) or other types of dynamic storage devices that can store information and instructions, may be electrically erasable programmable read only memories (EEPROMs), compact disc read only memories (CD-ROMs) or other optical disk storages, optical disc storages (including compact discs, laser discs, discs, digital versatile discs, blue-ray discs, etc.), magnetic storage media or other magnetic storage devices, or any other media that can carry or store desired programs and that can be accessed by computers.

The memory 8003 is used to store computer programs for executing the embodiments of the present disclosure, and is controlled by the processor 8001. The processor 8001 is used to execute the computer programs stored in the memory 8003 to implement the steps of the foregoing method embodiments.

The electronic device includes, but is not limited to, mobile terminals such as mobile phones, notebook computers, digital broadcast receivers, personal digital assistants (PDAs), tablet computers (PADs), portable multimedia players (PMPs) and in-vehicle terminals (such as in-vehicle navigation terminals), or stationary terminals such as digital TVs and desktop computers. The electronic device shown in FIG. 8 is only an example, and does not form any limitation to the functions and application range of the embodiments of the present disclosure.

Embodiments of the present disclosure provide a computer-readable storage medium having computer programs stored thereon that, when executed by a processor, implement steps and corresponding contents of the foregoing method embodiments.

Embodiments of the present disclosure further provide a computer program product including computer programs that, when executed by a processor, implement steps and corresponding contents of the foregoing method embodiments.

Terms such as “first”, “second”, “third”, “fourth”, “1” and “2” (if any) as used in the description, claims and drawings of the present disclosure are used to distinguish similar objects, and are not necessarily used to define a particular order or sequence. It should be understood that data, as used in such a way, may be used interchangeably if appropriate, so that the embodiments of the present disclosure described here may be implemented in an order other than those illustrated or described here.

It should be understood that although the steps in the flowchart of the embodiments of the present disclosure are sequentially indicated by following the arrows, these steps are not necessarily performed in the order indicated by the arrows. Unless explicitly stated herein, in some implementation scenarios of the embodiments of the present disclosure, the steps in the flowcharts may be executed in other sequences as required. In addition, based on actual implementation scenarios, some or all of the steps in the flowcharts may include multiple sub-steps or multiple stages. Some or all of the sub-steps or stages may be executed at the same moment of time, and each of the sub-steps or stages may be executed at different moments of time. In scenarios with different execution times, the execution order of these sub-steps or stages may be flexibly configured according to requirements, which is not limited in the embodiments of the present disclosure.

The foregoing descriptions are merely some implementations of the present disclosure. It should be noted that, to a person of ordinary skill in the art, without departing from the technical concept of the solutions of the present disclosure, the use of other similar implementation means based on the technical concept of the present disclosure also falls with the protection scope of the embodiments of the present disclosure.

What is claimed is:

1. A screen correction method, comprising:

acquiring a first display parameter of pixel points in at least two display regions of a target screen, wherein the first display parameter comprises first spectral tristimulus values;

determining a target region in the display regions and determining a second display parameter of pixel points in a non-target region in the display regions according to the first display parameter, wherein the target region is a display region among the display regions where a luminance parameter meets a preset requirement, and the second display parameter comprises second spectral tristimulus values;

converting the luminance parameter into a target display parameter with the same type of the second spectral tristimulus values; and compensating the second display parameter based on the target display parameter, wherein the compensating the second display parameter based on the target display parameter comprises:

sampling a compensation coefficient for pixel points in the non-target region to obtain a sampled compensation coefficient for each sampling unit; and compensating the second display parameter of pixel points in the non-target region according to the sampled compensation coefficient.

2. The screen correction method according to claim 1, wherein the acquiring a first display parameter of pixel points in at least two display regions of a target screen comprises:

in a case where a target screen displays a target image, acquiring a first display parameter of pixel points in at least two display regions of the target screen, wherein a gray level parameter of the target image is a preset gray level value.

3. The screen correction method according to claim 1, wherein before the acquiring a first display parameter of pixel points in at least two display regions of a target screen, the method comprising:

dividing a display interface of the target screen into at least two display regions;

or dividing the target screen into at least two display interfaces, and dividing each of the display interfaces into at least two display regions.

4. The screen correction method according to claim 1, wherein the luminance parameter comprises a mean value or a median value of the luminance of pixel points in the target region; and the preset requirement is that a luminance parameter of the target region is a minimum value, a mean value or a median value of luminance parameters in the display regions.

5. The screen correction method according to claim 4, wherein the compensating the second display parameter based on the target display parameter comprises:

determining a compensation coefficient for pixel points in the non-target region according to the target display parameter and the second display parameter; and compensating a second display parameter of pixel points in the non-target region according to the compensation coefficient.

6. The screen correction method according to claim 5, wherein the compensating the second display parameter of pixel points in the non-target region according to the sampled compensation coefficient comprises:

acquiring a reference compensation coefficient for a target pixel point in the non-target region, the reference compensation coefficient comprising the sampled compensation coefficient for a sampling unit adjacent to the target pixel point;

performing an interpolation process according to the reference compensation coefficient to obtain a target compensation coefficient for the target pixel point; and compensating the second display parameter of the target pixel point according to the target compensation coefficient.

7. An electronic device, comprising:

a memory, a processor, and computer programs stored on the memory and capable of running on the processor, cause the processor to:

acquire a first display parameter of pixel points in at least two display regions of a target screen, wherein the first display parameter comprises first spectral tristimulus values;

determine a target region in the display regions and determining a second display parameter of pixel points in a non-target region in the display regions according to the first display parameter, wherein the target region is a display region among the display regions where a luminance parameter meets a preset requirement, and the second display parameter comprises second spectral tristimulus values;

convert the luminance parameter into a target display parameter with the same type of the second spectral tristimulus values; and compensate the second display parameter based on the target display parameter, wherein when compensate the second display parameter based on the target display parameter, the process is configured to sample a compensation coefficient for pixel points in the non-target region to obtain a sampled compensation coefficient for each sampling unit; and compensate the second display parameter of pixel points in a non-target region according to the sampled compensation coefficient.

8. The electronic device according to claim 7, in a case where a target screen displays a target image, the processor is configured to acquire a first display parameter of pixel points in at least two display regions of the target screen, wherein a gray level parameter of the target image is a preset gray level value.

9. The electronic device according to claim 7, wherein before acquiring the first display parameter of pixel points in at least two display regions of the target screen, the processor is configured to:

divide a display interface of the target screen into at least two display regions;

or divide the target screen into at least two display interfaces, and divide each of the display interfaces into at least two display regions.

10. The electronic device according to claim 7, wherein the luminance parameter comprises a mean value or a median value of the luminance of pixel points in the target region; and the preset requirement is that a luminance parameter of the target region is a minimum value, a mean value or a median value of luminance parameters in the display regions.

11. The electronic device according to claim 10, wherein the processor is further configured to:

determine a compensation coefficient for pixel points in the non-target region according to the target display parameter and the second display parameter; and compensate a second display parameter of pixel points in the non-target region according to the compensation coefficient.

12. The electronic device according to claim 11, wherein the processor is further configured to:

acquire a reference compensation coefficient for a target pixel point in the non-target region, the reference compensation coefficient comprising the sampled compensation coefficient for a sampling unit adjacent to the target pixel point;

perform an interpolation process according to the reference compensation coefficient to obtain a target compensation coefficient for the target pixel point; and compensate the second display parameter of the target pixel point according to the target compensation coefficient.

13. A non-transitory computer-readable storage medium having computer programs stored thereon that, when executed by a processor, implement a screen correction method, the method comprising:

acquiring a first display parameter of pixel points in at least two display regions of a target screen, wherein the first display parameter comprises first spectral tristimulus values;

determining a target region in the display regions and determining a second display parameter of pixel points in a non-target region in the display regions according to the first display parameter, wherein the target region is a display region among the display regions where a luminance parameter meets a preset requirement, and the second display parameter comprises second spectral tristimulus values;

converting the luminance parameter into a target display parameter with the same type of the second spectral tristimulus values; and compensating the second display parameter based on the target display parameter, wherein the compensating the second display parameter based on the target display parameter comprises:

sampling a compensation coefficient for pixel points in the non-target region to obtain a sampled compensation coefficient for each sampling unit; and compensating the second display parameter of pixel points in the non-target region according to the sampled compensation coefficient.

* * * * *